United States Patent [19]
Sano et al.

[11] Patent Number: 5,661,836
[45] Date of Patent: Aug. 26, 1997

[54] OPTICAL CABLE AND MANUFACTURING METHOD THEREOF

[75] Inventors: Hiroaki Sano; Hiroki Ishikawa; Shigeru Tanaka; Nobumasa Nirasawa; Kenji Morita, all of Kanagawa; Osamu Kawata; Kazuo Hogari, both of Ibaraki, all of Japan

[73] Assignees: Sumitomo Electric Industries, Ltd., Osaka; Nippon Telegraph and Telephone Corporation, Tokyo, both of Japan

[21] Appl. No.: 605,549

[22] Filed: Feb. 20, 1996

[30] Foreign Application Priority Data

Feb. 20, 1995 [JP] Japan .................. 7-030304
Mar. 20, 1995 [JP] Japan .................. 7-060785

[51] Int. Cl.$^6$ ........................... G02B 6/44
[52] U.S. Cl. ........................... 385/111; 385/147
[58] Field of Search .................. 385/100, 104, 385/108, 134, 135, 147

[56] References Cited

U.S. PATENT DOCUMENTS

| | | | |
|---|---|---|---|
| 4,205,899 | 6/1980 | King et al. | 385/111 X |
| 4,381,140 | 4/1983 | Van Der Hoek et al. | 385/104 |
| 4,828,352 | 5/1989 | Kraft | 385/111 X |
| 5,127,076 | 6/1992 | Lepri et al. | 385/111 |

FOREIGN PATENT DOCUMENTS 63-301911 12/1988 Japan.

*Primary Examiner*—Akm E. Ullah
*Attorney, Agent, or Firm*—Cushman Darby & Cushman IP Group of Pillsbury Madison & Sutro, LLP

[57] ABSTRACT

In an optical cable according to the present invention, a grooved spacer has a plurality of grooves in its circumference, and the cutting direction of the grooves is inverted at predetermined periods. Optical fibers are received in the respective grooves. On the circumference of the grooved spacer, a linear member is provided around the grooved spacer along the longitudinal direction of the optical cable at a predetermined period. The linear member is fixed to the grooved spacer by welding or bonding in the portions where they touch the outer circumferences of the grooved spacer so as to restrain the optical fibers. The linear member restraining the optical fiber to be taken out are cut in positions above the groove in which the optical fiber is received so that the required optical fiber can be taken out.

21 Claims, 8 Drawing Sheets

OPTICAL CABLE AND MANUFACTURING METHOD THEREOF

BACKGROUND OF THE INVENTION

1. Field of the Invention

The present invention relates to an optical cable in which a plurality of optical fibers are received, and a desired one of the optical fibers in easy to take out and branch at an intermediate portion of the cable, and a manufacturing method thereof.

2. Description of the Related Art

Recently, it has come to be necessary to lay optical fibers to users as in seen in general residential areas. In laying optical fibers, it is required to reduce the number of connection points of the optical fibers to the minimum in order to maintain the transmission quality good, and it is also required to reduce the construction cost of an optical communication network. In order to satisfy those requirements, there is a method wherein an optical cable in which excessive optical fibers are received and the optical fibers can be taken out at the intermediate portion of the cable easily is used, so that in an existing optical cable which is in use, a required number of ones of excessive optical fibers received therein can be branched and taken out at desired portions of the optical cable other than its terminals in order to cope with newly produced necessity.

Conventionally, there has been known a so-called SZ slotted optical cable, that is, an optical cable having a reverse-lay unit core, as an optical cable in which it is easy to take out optical fibers at an intermediate portion, as disclosed, for example, in Unexamined Japanese Patent Publication No. Sho-63-301911, and the like. This optical cable has a structure in which the rotating direction of a plurality of spiral grooves cut in a grooved spacer is inverted at predetermined periods, and optical fibers are received in these spiral grooves respectively. A costing layer formed by an extrusion coating of synthetic resin may be provided on the outside of the grooved spacer, and a pressing winding of, for example, non-woven fabric or the like, a pressing winding of a filament-like body such as a nylon yarn spirally wound at intervals, or an aluminum layer may be provided under the coating layer. Herein, those layers are called a sheath collectively. That is, it can be said that the structure in which optical fibers are received in SZ slots (grooves) and a sheath is given thereon has been known.

In such a branching working, some of the optical fibers in the optical cable are taken out while some of the optical fibers are in use for transmission. In a conventional optical cable, there has been a problem that not only specific optical fibers which are required to be taken out but also other optical fibers which are in use may pop out in the inverted portion of the grooves when the sheath is removed in the branching working. If the popped-out optical fibers which are in use touch a neighboring object, a change of loss is produced in optical signals which are being transmitted. Consequently, there has been a problem that the transmission quality of the optical fibers which are in use deteriorates.

SUMMARY OF THE INVENTION

It is an object of the present invention to provide an optical cable in which desired optical fibers can be taken out without allowing the other optical fibers to pop out when the optical cable which has been laid is branched at its intermediate portion.

An optical cable according to the present invention is comprised of: a spacer having a plurality of grooves formed on an outer circumference thereof; optical fibers received respectively in the grooves, the cut direction of the grooves being inverted at predetermined periods; and a pop-out preventing member which locally seal opening portions of the grooves.

According to the optical cable of the present invention, the optical fibers are prevented from popping out at the inverted portions of the groove by the pop-out preventing members for sealing the opening portions of grooves locally. Since the pop-out preventing members seal the opening portions of grooves locally, only the required optical fibers can be taken out from the grooves by cutting or deforming the pop-out preventing members for the optical fibers to be taken out, or detaching the portions of only the required optical fibers integrated with the grooved spacer, etc. The other optical fibers are sealed with thee pop-out preventing members associated therewith, and therefore they do not p op out from the grooves. In addition, the pop-out preventing members are provided locally, the optical fibers received in the associated grooves can be recognized through spaces between the pop-out preventing members.

PREFERRED EMBODIMENTS OF THE INVENTION

Figure 1A:
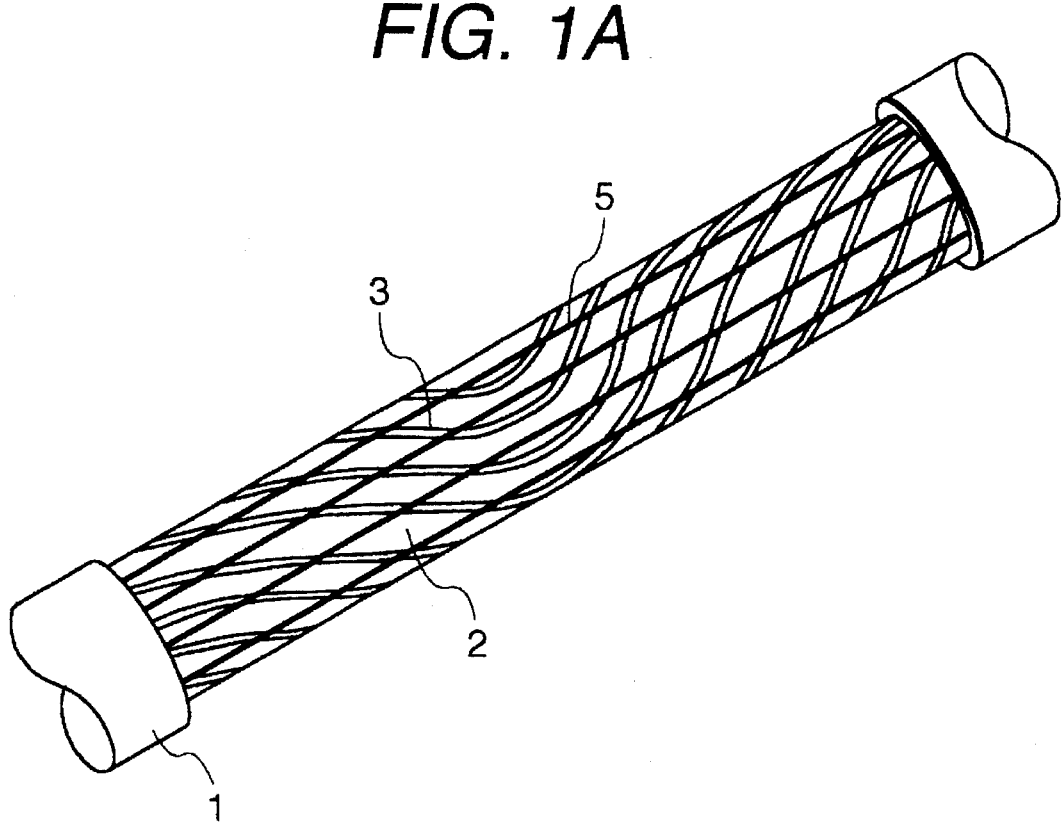
FIG. 1A is a perspective view of a first embodiment of the present invention, in the state where a part of a sheath is removed.
Figure 1B:
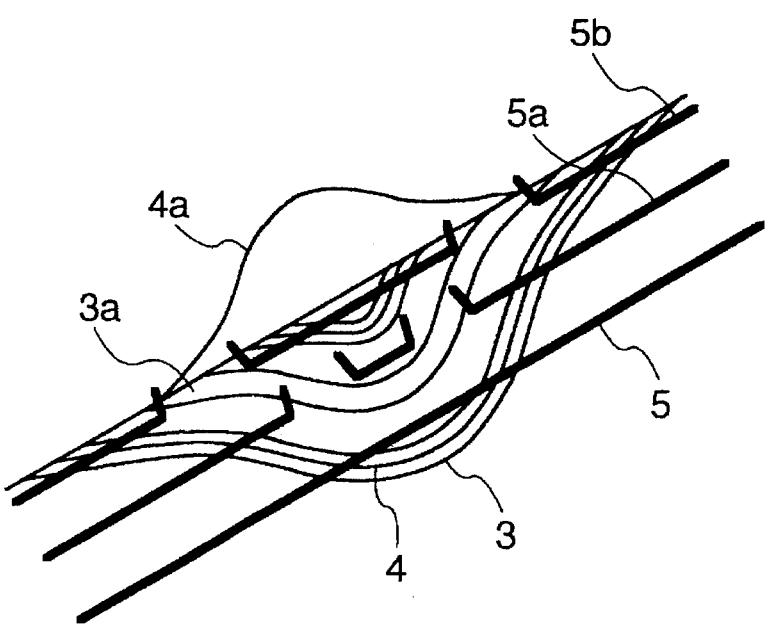
FIG. 1B is an explanatory diagram of a method of taking-out optical fibers.

Preferred embodiment of the present invention will be described referring to the accompanying drawings as follows:

FIGS. 1A and 1B illustrates a first embodiment of the present invention. FIG. 1A is a perspective view of a state where a part of a sheath is removed, and FIG. 1B is an explanatory diagram of a method of taking out optical fibers. In the drawings, the reference numeral 1 represents a sheath; 2, a grooved spacer; 3 and 3a, grooves; 4 and 4a, optical fibers; and 5, 5a and 5b, linear members.

The whole structure will be described with reference to FIG. 1A. On the periphery of the grooved spacer 2, a plurality of grooves 3 are formed so that the cutting direction of the grooves is inverted at predetermined periods. These grooves 3 are SZ slots. Not-shown optical fibers are received in the respective grooves 3, and the linear members 5 are fixed on the grooved spacer 2 over the optical fibers. The respective linear members 5 are integrated with the grooved spacer 2 in the portions where the respective linear members 5 touch the outer circumference of the grooved spacer 2, so that the linear member 5 are fixed with the grooved spacer 2. Welding, bonding, engagement, or the like, may be used as the method of fixation. It is not necessary to fix the respective linear member 5 entirely over the portions where the respective linear member 5 touch the grooved spacer 2, that is, entirely over the portions between the grooves, but it is necessary that the respective linear member 5 are fixed only at part, for example, only at points.

The linear member 5 the number of which is the same as that of the grooves locally seal the opening portions of the grooves 3, including the opening portions of the grooves 3 at the inverted portions 4, in the embodiment shown in FIG. 1A. It is however not always necessary to make the number of the grooves 3 equal to that of the linear member 5. The sheath 1 is provided thereon.

Even if the sheath 1 is removed, the optical fibers are prevented from popping out of the grooves at the inverted portions of the grooves, because the opening portions of the grooves are partially sealed with the respective linear member 5. Accordingly, the respective linear member 5 act as pop-out preventing members.

The method of taking-out optical fibers will be described with reference to FIG. 1B. In this drawing, only three grooves in the vicinity of the inverted portions of the grooves 3 are illustrated. The optical fiber 4a is taken out from the groove 3a, and the other optical fibers 4 are left as they are received in the other grooves 3. When the optical cable is branched at its intermediate portion, first, a part of the sheath 1 of the optical cable is removed by an appropriate length as shown in FIG. 1A. Returning to FIG. 1B, further description will be made. The linear member 5a and 5b sealing the groove 3a from which the optical fiber 4a is to be taken out are cut, and, if necessary, bent up as illustrated in the drawing, so that the sealing is released. Thus, it is possible to lift and take out the optical fiber 4a from the groove 3a as illustrated in the drawing. The identification of the optical fiber to be taken out may be performed by inspecting by eyes the optical fibers received in the grooves 3 through the gaps between the linear member 5. Preferably, coloring, patterning, or the like, is given to the coatings of the respective optical fibers in order to make the identification easier.

Tapes, ribbons, yarns, strings, non-twisting yarns, metal wires, etc. may be used as the material of the linear member described with respect to FIGS. 1A and 1B. Particularly, in the case where yarns made of synthetic resin such as nylon, or the like, or metal fibers are used for the linear member 5, the linear member 5 may be fixed to the grooved spacer 2 in such a process that the linear member are put along the grooved spacer 2 made of thermoplastic resin in the longitudinal direction of the optical cable after optical fibers is received in the grooves 3, and then the grooved spacer 2 is fused and integrated with those linear member 5 in a condition that these linear member are heated. When metal wires are used for the linear member 5, the linear member 5 may be integrated with the grooved spacer 2 in a condition that the metal wires are heated. The metal wires may be heated by conducting a current therethrough.

In a specific example, the grooved spacer 2 is made of polyethylene, and the diameter is 10 mm. Each of the grooves 3 is 1.2 mm in width and 1.6 mm in depth. A tape of polyethylene 1 mm in width and 0.2 mm in thickness is used as the material for the linear member 5. Each of the optical fibers 4 is a nylon-optical fiber having an outer diameter of 0.9 mm. As the optical fibers, desired ones, such as single-core or multi-core optical fiber coated with resin, or tape-shaped optical fibers, or the like, may be used.

Figure 2:
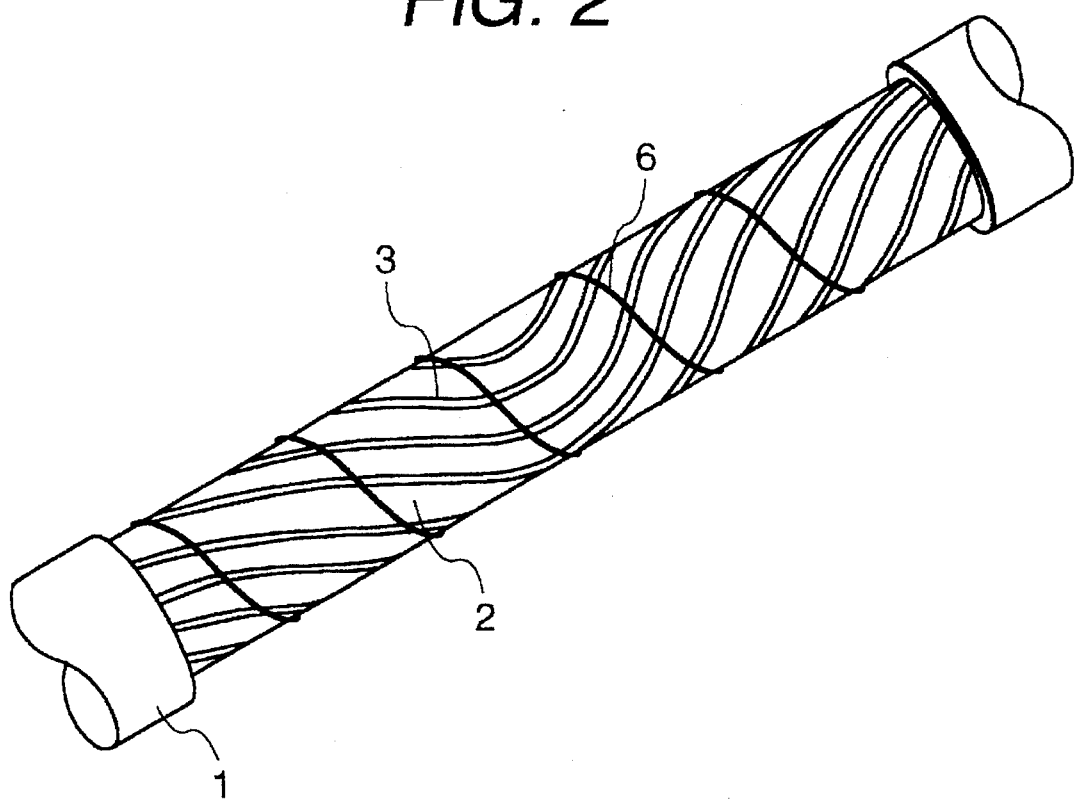
FIG. 2 is a perspective view of a second embodiment of the present invention, in the state where a part of a sheath of an optical cable is removed.

FIG. 2 is a perspective view illustrating a second embodiment of the present invention, where a sheath of an optical cable is partly removed. In the drawing, parts similar to those in FIGS. 1A and 1B are referenced correspondingly, and their description about them will therefore be omitted. Optical fibers received in grooves 3 are not shown in the drawing. The reference numeral 6 represents a linear member. This embodiment is different from the first embodiment in that the belt-shaped 6 is wound around a grooved spacer 2 spirally in one direction. The linear member 6 is fixed to and integrated with the grooved spacer 2 in the portions where the linear member 6 touches the outer circumference of the grooved spacer 2, similar to the first embodiment.

Although only one linear member 6 is used in the embodiment shown in FIG. 2, the number of the linear member 6 is not limited to one, but a plurality of linear member may be wound around and integrated with the grooved spacer 2.

The same material of the linear member and the same method of fixation thereof as those in the first embodiment may be used. The linear member 6 is integrated with the grooved spacer 2 after it is wound thereon. Therefore, there is no fear that the linear member is loosened in the unwinding direction, so that it is not always necessary to wind them only in one direction, the winding direction may be changed appropriately.

Also in this second embodiment, optical fibers not shown and received in the grooves 3 can be identified by inspecting the optical fibers by eyes through the gaps between portions of the linear member 6 in the same manner as in the first embodiment. If the linear member 6 which presents optical fibers to be taken out from popping out is cut at a position above the grooves 3 in the vicinity of the inverted portions of the grooves 3, the required optical fibers can be taken out. Being sealed with the linear member 6, the other optical fibers cannot pop out from the grooves 3.

Figure 3:
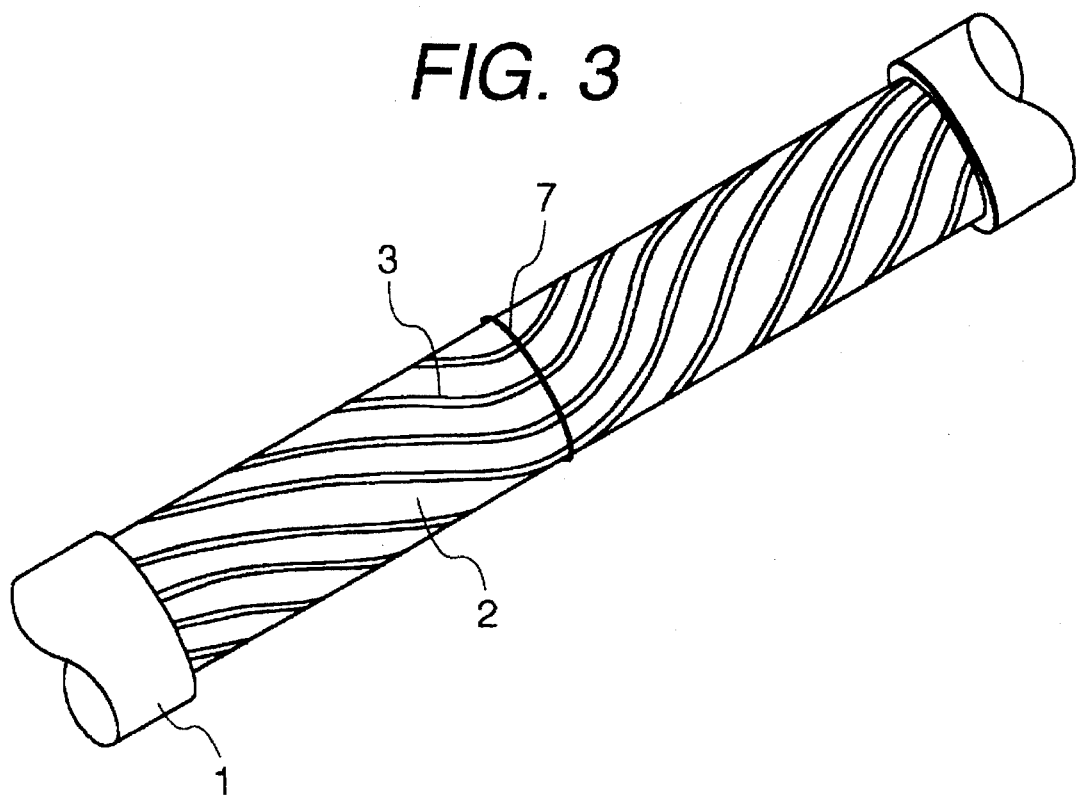
FIG. 3 is a perspective view of a third embodiment of the present invention, in the state where a part of a sheath of an optical cable is removed.

FIG. 3 is a perspective view illustrating a third embodiment of the present invention, where a sheath of an optical cable is partly removed. In the drawing, parts similar to those in FIGS. 1A and 1B are referenced correspondingly, and the description about them will be therefore omitted. Optical fibers received in grooves 3 are not shown in the drawing. The reference numeral 7 represents an annular member. This embodiment is different from the first or second embodiment in that the annular members 7 are provided discretely in the longitudinal direction of a grooved spacer 2. The annular members 7 may be provided at regular intervals or at not-regular intervals. In the same manner as in the first and second embodiments, the annular members 7 are fixed and integrated with the grooved spacer 2 in the portions where the annular members 7 touch the outer circumference of the grooved spacer 2. The annular members 7 are pop-out preventing members for preventing optical fibers from the popping out from grooves 3. In the preferred specific example of this embodiment, the annular members 7 are provided in the vicinity of the inverted portions of the grooves 3. However, it is not necessary to provide one annular member for each inverted portion, but, for example, a plurality of annular members may be provided for each inverted portion.

Each annular member 7 may have a cutaway section at a portion, so that it can be fitted onto the grooved spacer 2 having optical fibers received in the grooves 3, from the side of the grooved spacer 2 by expanding this cutaway section. The annular member 7 may be formed by winding a linear member of a predetermined length around the grooved spacer 2 by one or more turns.

The same material and the same method of fixation as those of linear member in the first embodiment may be used for the annular member 7.

In this third embodiment, individual optical fibers received in the respective grooves 3 may be easily identified by inspecting the color, pattern, or the like, of the surface of the optical fibers, by eyes. If the annular member 7 is cut above the grooves 3 in which the optical fibers to be taken out are received and in the vicinity of the inverted portions of the grooves 3, the required optical fibers can be taken out. In this embodiment, not only it is possible to reduce the number of pop-out preventing members, but also it is possible to take out optical fibers received in grooves along a length twice as long as the interval between the annular members, only by cutting the annular member 7 at its one point, in the case where one annular member 7 is used for each inverted portion of the grooves.

Figure 4:
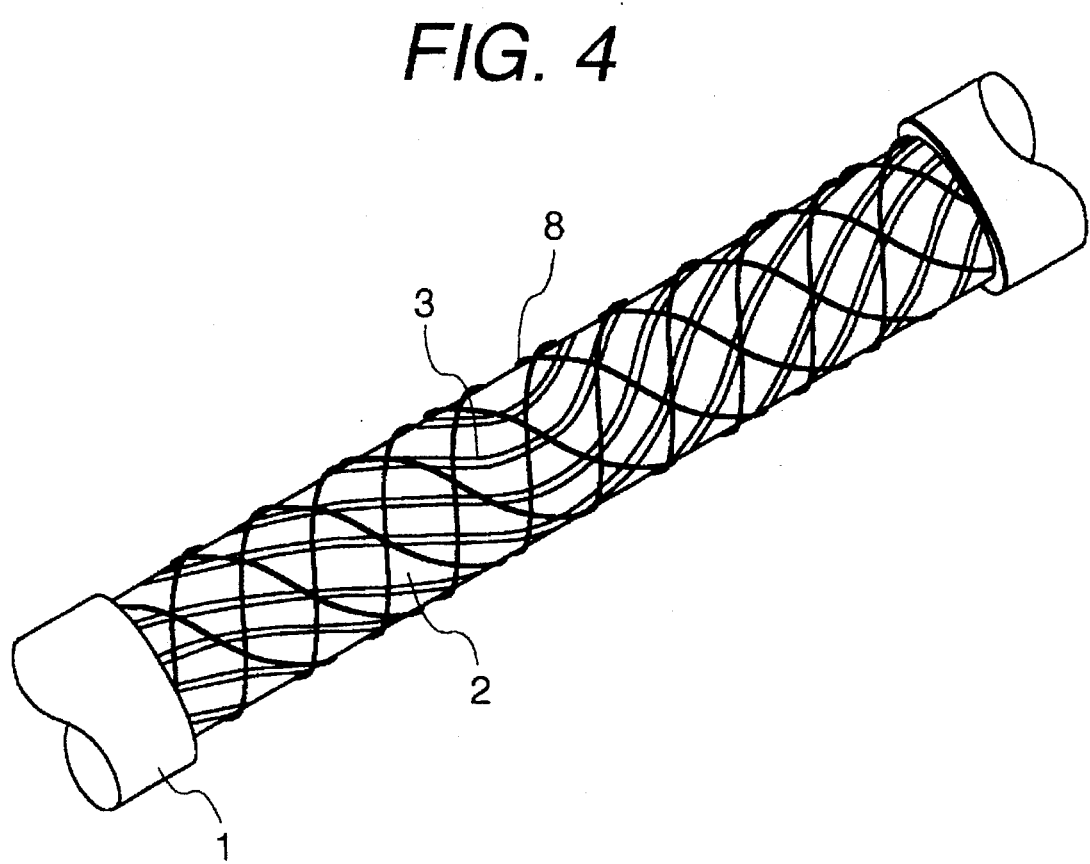
FIG. 4 is a perspective view of a fourth embodiment of the present invention, in the state where a part of a sheath of an optical cable is removed.

FIG. 4 is a perspective view illustrating a fourth embodiment of the present invention, where a part of a sheath of an optical cable is removed. In the drawing, parts similar to those in FIGS. 1A and 1B are referenced correspondingly, and the description about them will be therefore omitted. Optical fibers received in grooves 3 are not shown in the drawing. The reference number 8 represents a net member. In this embodiment, there is used a net member netted by winding linear member spirally in one direction and the opposite direction around the outer circumference of a grooved spacer 2 in which optical fibers are received. The linear member are fixed with each other in the intersecting portions of the net, as if the grooved spacer 2 is covered with a net. This net member prevents the optical fibers from popping out from the grooves 3 at inverted portions of grooves 3 so as to locally seal the opening portions of the grooves 3. Therefore, the net member acts as a pop-out preventing member. The number of the linear member may be selected desirably, and the number and pitch of linear member wound in one direction may be selected to be equal to or not equal to those of linear member wound in the opposite direction.

The same material as that for linear member in the first embodiment may be used for the net member 8. The intersecting portions of the net may be fixed with each other by welding or bonding with a bonding material. Further, the intersecting portions may be partially fixed to the outer circumference of the grooved spacer 2.

Also in this embodiment, optical fibers received in the grooves 3 may be recognized through the gaps of the net member 8 in the same manner as in the first embodiment. If the net member 8 for preventing optical fibers to be taken out from popping out is cut as a position above the grooves 3 in the vicinity of the inverted portion of the grooves 3, the required optical fibers may be taken out.

Figure 5:
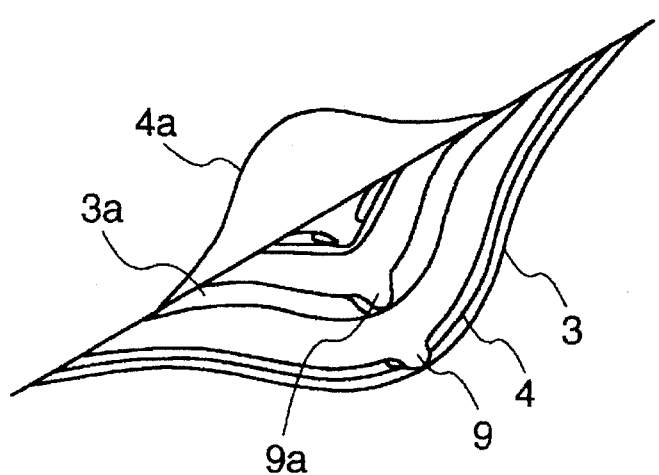
FIG. 5 is an explanatory diagram of a fifth embodiment of the present invention.

FIG. 5 is an enlarged view showing the neighborhood of an inverted portion of grooves similarly to FIG. 1B, for explaining the fifth embodiment of the present invention. In the drawing, parts similar to those in FIG. 1A and 1B are referenced correspondingly, and the description about them will be therefore omitted. The reference numerals 9 and 9a represent nail members. This embodiment is different from the above embodiments in that nail members are provided in grooves without using any members wound around a grooved spacer having optical fibers received therein such as a linear member, the annular members or the net member in the preceding embodiments. The nail members 9 and 9a are formed so as to project from the inner side edges of grooves 3 and 3a toward the outer side edges of the same at inverted portions of the grooves 3 and 3a to cover the opening portions of the grooves. Optical fibers are prevented from popping out from the inverted portions of the grooves 3 by the nail members 9 and 9a. Therefore, these nail members 9 and 9a seal the opening portions of the respective grooves 3 and 3a locally so as to act as pop-out preventing members for optical fibers 4 and 4a. The number of the nail members provided at each of inverted portions is not limited to one, but may be two or more.

Since the optical fibers 4 are apt to pop out from the inner side edges of the inverted portions of the grooves 3, it becomes more difficult for the optical fibers to pop out if the nail members 9 and 9a are made to project from the inner side edges at the inverted portions of the grooves 3. The nail member 9a in the groove 3a having the optical fiber 4a to be taken out received therein is bent so that the gap between the nail member 9a and the outer side edge at the inverted portion widened so that the optical fiber 4a can be taken out.

It is preferable that these nail members 9 and 9a partially cover the opening portions of the grooves 3 so that the width of the opening portions are partially smaller than the diameter of the optical fibers 4 and 4a. However, if the nail members 9 and 9a are provided on the inner side edges of the inverted portions, the optical fibers are difficult to pop out, and therefore such a condition may be relaxed.

The method of producing the grooved spacer 2 having such a structure will be described. First, a projecting structure is provided in advance on the inner side edge of each of the grooves at its inverted portion when the grooved spacer 2 is molded. After the optical fibers 4 are received in the grooves 3, this projecting structure is heated into a form along the outer side edge of the grooved spacer 2. Alternatively, the nail member 9 may be attached as a separate part by welding or bonding after the optical fibers 4 are received in the grooves 3.

As a modification of this fifth embodiment, coupling members which bridge the opposite side edges of the respective grooves 3 locally may be used as the nail members in the vicinity of the inverted portions of the grooves 3. In this modification, required optical fibers may be taken out by cutting nail members which prevent popping out of the optical fibers to be taken out. The grooved spacer 2 having such a structure may be manufactured in the same manner as the grooved spacer 2 having the nail members as described previously. Alternatively, separately provided coupling members may be simply pushed into the grooves so as to make them act as pop-out preventing members.

In the above embodiments, a sheath is provided on the outer circumference of a grooved spacer having optical fibers received therein and pop-out preventing members are provided thereon. Synthetic resin is generally used as a material for the sheath. Of course, the sheath may be formed of a plurality of layers, for example, by providing a sheath layer of synthetic resin on a layer of pressing winding, etc. A high tensile strength body may be disposed inside the grooved spacer.

Not to say, in the present invention, it is not necessary to provide the sheath directly on the optical cable. If weather-proof optical fibers are used, the cable may be laid as it is. A plurality of optical cables as described in the above embodiments but provided with no sheath, or provided with simple sheaths such as pressing windings, may be twisted into a multi-core optical cable. In this case, a tensile strength bodies may be disposed at an appropriate place such as at the center portion, or the like.

Figure 6A:
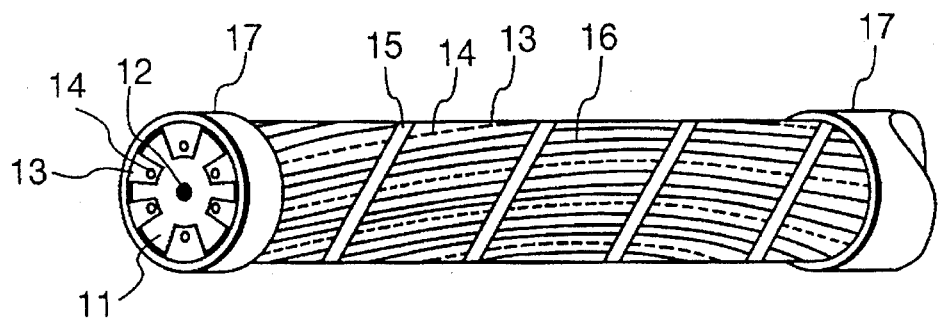
FIG. 6A is an explanatory diagram of an optical cable of a sixth embodiment, in the state where a part of a sheath has been removed.
Figure 6B:
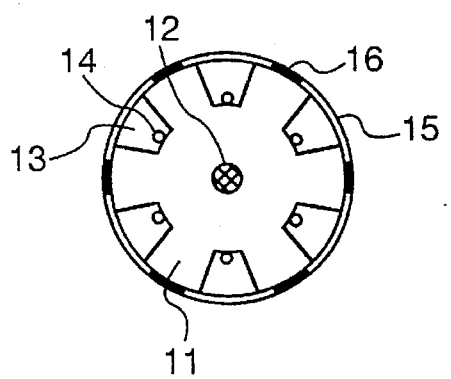
FIG. 6B is an explanatory diagram for explaining the state where a linear member is fixed.
Figure 6C:
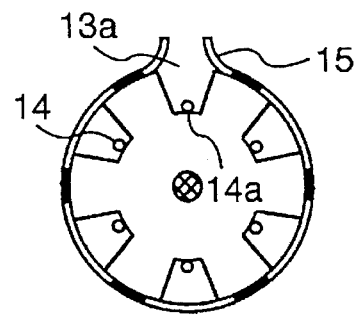
FIG. 6C is an explanatory diagram of a method of taking-out an coated optical fiber.

FIGS. 6A to 6C shows a sixth embodiment of the present invention. FIG. 6A is an explanatory diagram of an optical cable in the state where a part of a sheath is removed, FIG. 6B is an explanatory diagram for explaining the bonding state of a linear member, and FIG. C is an explanatory diagram of a method of taking-out optical fibers. In the drawings, the reference numeral 11 represents a spacer; 12, a tensile strength body; 13 and 13a, grooves; 14 and 14a, optical fibers; 15, a linear member; 16, a bonding agent; and 17, a sheath.

The whole structure will be described with reference to FIG. 6A. The spacer 11 has an approximately circular section, and has the tensile strength body 12 in its center. In addition, in the periphery of the spacer 11, a plurality of grooves 13 are formed so that the cutting direction of the grooves is inverted at predetermined periods. These grooves 13 are, for example, spiral SZ slots. An optical fiber 14 is stored in each of the grooves 13, and thereon the linear member 15 is wound spirally in one direction around the spacer 11. Although this winding may be performed at regular intervals or at irregular intervals, this interval is preferably made smaller than the interval of inversion of the cutting direction of the grooves 13 because the optical fiber 14 is taken out in the vicinity of the portion where the cutting direction of the grooves 13 is inverted.

Along each of the grooves 13, the bonding agent 16 is provided on the outer circumferential surface of the spacer 11 and on at least a part of portions between the grooves 13. Each linear member 15 is fixed and bonded to the spacer 11 by means of the bonding agent 16 in the portions where the linear member 15 contacts with the outer circumferential surface of the spacer 11. The sheath 17 is given onto the spacer 11 and the linear member 15. Thus, the spacer 11 and the linear member 15 are covered with the sheath 17.

Although only one linear member 15 is used, the number thereof is not limited in one, but a plurality of linear members may be wound and fixed to the spacer 11 by bonding. The linear member 15 is integrated with the spacer 11 after it is wound. Therefore, there is not fear that the linear member 15 is loosened in the rewinding direction, so that it is not always necessary to wind the linear member 15 in one direction, and the direction of winding may be changed desirably.

The state where the linear member 15 is fixed will be described with reference to FIG. 6B. As for the fixation of the linear member 15, it is not necessary to bond the linear member 15 all over the portions where the linear member 15 contacts with the spacer 11, that is, all over the portions between the grooves. The linear member 15 may be fixed on the outer circumferential surface on at least a part of portions between the grooves, preferably in the central portion and along the grooves. The bonding agent 16 is provided along the grooves 13 on the outer circumferential surface of the spacer 11 and on at least a part of portions between the grooves, preferably only in the central portion. The bonding agent 16 may be provided all over the outer circumferential surface between the grooves. When the linear member 15 is wound, there is a possibility that the bonding agent 16 is extended onto the spacer 11 a little, but when the bonding agent 16 is provided only in the central portion, there is no fear that the bonding agent 16 enters the grooves 13 so that the bonding agent 16 adheres to the optical fibers 14 received in the grooves.

The method of taking-out an optical fiber will be described with reference to FIG. 6C. This drawing shows the section in the vicinity of an inverted portion of the grooves 13. When the working of branching in an intermediate position is performed on the optical cable according to the sixth embodiment of the present invention, first, a part of the sheath 17 of the optical cable is removed over a desired length as shown in FIG. 6A. Next, the optical fibers 14 received in the grooves 13 are inspected through the gaps of the linear member 15, and a optical fiber 14a to be taken out is identified. Return to FIG. 6C. On the portion where the linear member 15 is over the groove 13a to seal the optical fiber 14a to be taken out, the linear member 15 is cut off at one or a plurality of places in the vicinity of the inverted portion of the groove 13a. The linear member 15 is bent upward so that the sealing is released, if necessary, as illustrated. Thus, the optical fiber 14a can be taken out from the groove 13a. Since the linear member 15 keeps its function of pressing winding for the other optical fibers 14 to thereby keep the sealing state, there is not fear that the other optical fibers 14 pop out of their grooves 13. In order to easily identify the optical fiber 14a to be taken out, preferably, coloring or patterning, or letters, signs or the like are given to the coatings of the optical fibers 14.

Figure 7:
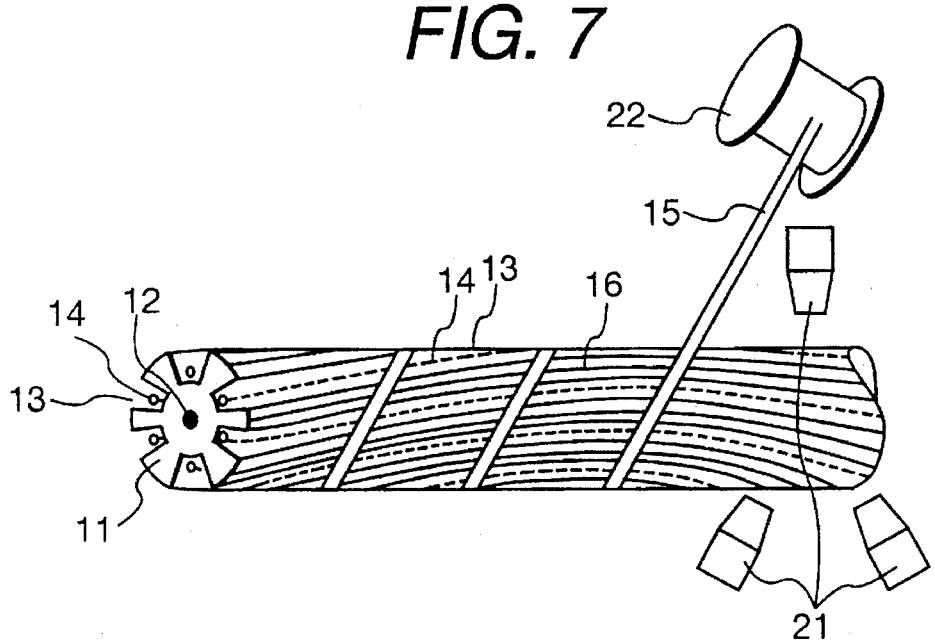
FIG. 7 is an explanatory diagram of an example of the method of manufacturing the optical cable according to the sixth embodiment of the present invention.

FIG. 7 is an explanatory diagram for explaining an example of the method of manufacturing the optical cable according to the sixth embodiment of the present invention. In the drawing, parts similar to those in FIGS. 6A and 6B are referenced correspondingly, and the description about them will be omitted. The reference numeral 21 represents a hot air generator, and 22, a linear member feeding apparatus. At the time of extrusion molding of the spacer 11, the bonding agent 16 is extruded together with the spacer 11 in such a form that the bonding agent 6 swells on the outer circumferential surface of the spacer 11. In the process to receive the optical fibers 14 into the grooves 13 of the spacer 11, after the optical fibers 14 are received in the grooves 13, hot air is blown from the hot air generator 21 so as to heat at least the outer circumferential surface of the spacer 11, particularly, the bonding agent 16, and the linear member 15 from the linear member feeding apparatus 22 is wound around the spacer 11 spirally at intervals and bonded to the spacer 11 by the bonding agent 16. Alternatively, the hot air may be blown before the optical fibers 14 are received in the grooves 13.

Tape, ribbon, yarn, string, non-twisting yarn, thin metal wire, etc., which can be cut easily, may be used as the material of the linear member 15. Particularly, if yarn made of synthetic resin such as nylon and so on is used, it is possible not only to obtain enough strength, but also to cut the linear member with scissors, a knife or the like easily. The same effect can be obtained in the case of use of a string or tape of polyethylene. As the bonding agent 16, it is not necessary to provide a so-called bonding agent, but substances having adhesion may be used. That which becomes melted at the time of heating and is solidified after cooling may be also used. Admer, polyethylene having a low melting point, etc. may be used. As the optical fibers 14, desired ones such as single-core optical fibers, tape-shaped optical fibers having a number of cores and coated with resin may be used. A plurality of optical fibers may be received in one groove 13.

In a specific example of this embodiment, the outer diameter of the spacer 11 was 10 mm, and six SZ slot type grooves were cut in the spacer. Each of the grooves was 1.2 mm wide and 1.6 mm deep. Each of the optical fibers 4 received in the respective grooves respectively in one was a nylon-optical fiber the outer diameter of which was 0.9 mm. Nylon yarn was used as the linear member 15, and wound at a pitch of 20 mm. Admer was used as the bonding agent 16 provided on the outer circumferential surface of the spacer 11, and extruded so as to swell to be about 0.3 mm high on the outer circumferential surface of the spacer 11.

Figure 8A:
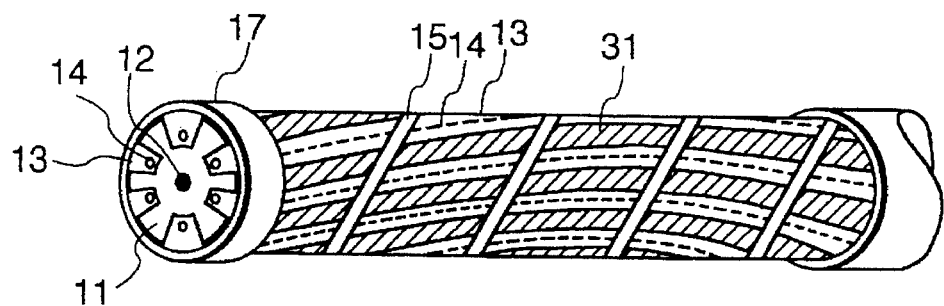
FIG. 8A is an explanatory diagram of an optical cable of a seventh embodiment, in the state where a part of a sheath is removed.
Figure 8B:
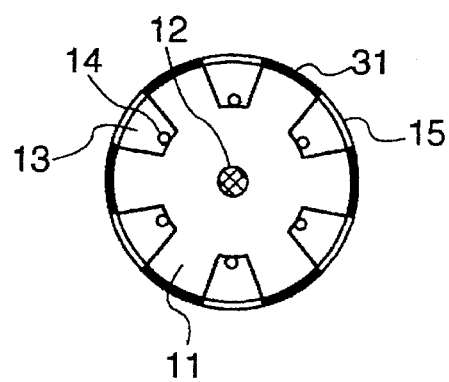
FIG. 8B is an explanatory diagram for explaining the state where a linear member is fixed.

FIG. 8 explains a seventh embodiment of the present invention. FIG. 8A is an explanatory diagram of an optical cable in the state where a part of a sheath has been removed, and FIG. 8B is an explanatory diagram for explaining the state where a linear member is fixed. In the drawings, parts similar to those in FIGS. 6A and 6B are referenced correspondingly, and the description about them will be omitted. The reference numeral 31 represents a bonding agent layer. The whole structure will be described with reference to FIG. 8A. Although the embodiment is different from the sixth embodiment shown in FIG. 6 in the point that the bonding agent layer 31 is provided all over the outer circumferential surface of the spacer 11 between grooves, the other points are similar to the structure of the sixth embodiment. A linear member 15 is wound and bonded on the outer circumferential surface of the spacer 11 at intervals. The state where the linear member 15 is fixed will be described with reference to FIG. 8B. The bonding agent layer 31 is provided on the outer circumferential surface of the spacer 11, that is, all over the surface of the spacer 11 between the grooves. The linear member 15 is bonded to the spacer 11 all over the portion between the grooves. The method of taking-out an optical fiber is similar to that in the sixth embodiment.

Figure 9:
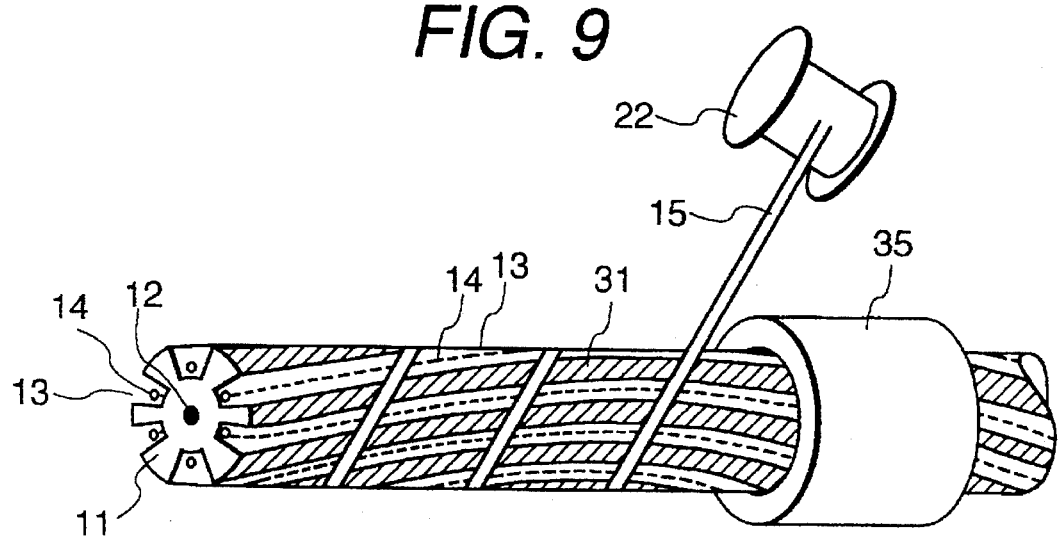
FIG. 9 is an explanatory diagram of an example of the method of manufacturing the optical cable according to the seventh embodiment of the present invention.

FIG. 9 is an explanatory diagram for explaining the method of manufacturing the optical cable according to the seventh embodiment of the present invention. In the drawing, parts similar to those in FIGS. 1A to 3 are referenced correspondingly, and the description about them will be omitted. The reference numeral 35 represents a bonding agent coater. In the process to receive the optical fibers 14 into the grooves 13 of the spacer 11, after the optical fibers 14 are received in the grooves 13, a bonding agent is applied onto the outer circumferential surface of the spacer 11 by the bonding agent coater 35 so as to form the bonding agent layer 31. Further, the linear member 15 fed from the linear member feeding apparatus 22 is wound around the spacer 11 spirally at intervals, and bonded to the spacer 11 by the bonding agent 16. Alternatively, the bonding agent layer 31 may be formed by the bonding agent coater 35 before the optical fibers 14 are stored in the grooves 13 of the spacer 11. The spacer 11 and the bonding agent layer 31 may be heated by the hot air generator 21 in the same manner as in the method of manufacturing the optical fiber according to the sixth embodiment.

The same shape and size of the spacer 11, the same material of the linear member 15, the same bonding agent for the bonding agent layer 31, and the same optical fibers 14 as those used in the sixth embodiment may be used also in this seventh embodiment. By way of example, nylon yarn was used as the linear member 15, and wound at a pitch of 20 mm, and molten polyethylene having a low melting point was used as the bonding agent, so that the similar effect to that in the sixth embodiment could be obtained.

According to the optical cable in the seventh embodiment of the present invention, it is not necessary to provide a special spacer for branching in an intermediate portion, and it is possible to use a usual spacer, so that there is an advantage that the number of kinds of spacers can be restrained from increasing.

Figure 10A:
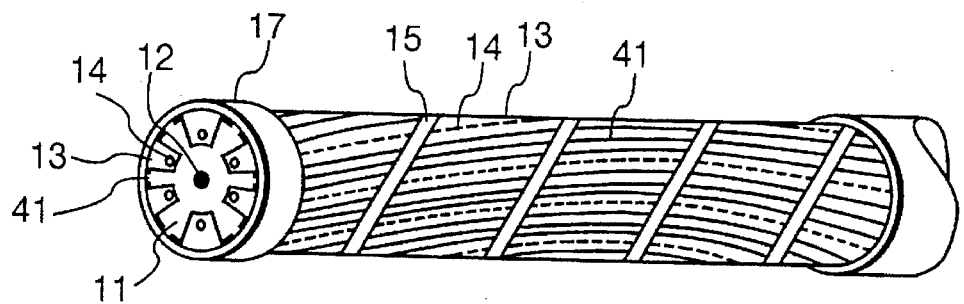
FIG. 10A is an explanatory diagram of an optical cable of an eighth embodiment of the present invention, in the state where a part of a sheath is removed.
Figure 10B:
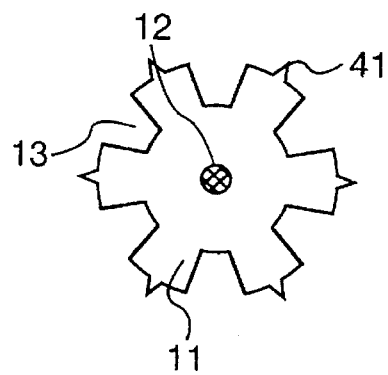
FIG. 10B is an explanatory diagram for explaining the state where a linear member is not fixed yet.
Figure 10C:
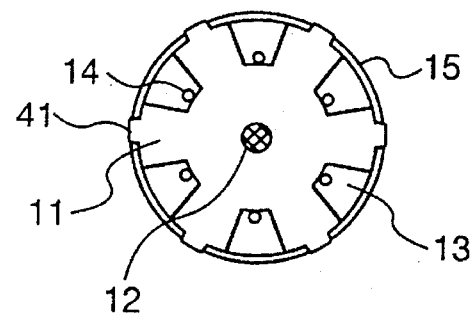
FIG. 10C is an explanatory diagram for explaining the state where the linear member is fixed.

FIGS. 10A to 10C explains a eighth embodiment of the present invention. FIG. 10A is an explanatory diagram of an optical cable in the state where a part of a sheath is removed, FIG. 10B is an explanatory diagram for explaining the state where a linear member is not fixed yet, and FIG. 10C is an explanatory diagram for explaining the state where the linear member is fixed. In the drawings, parts similar to those in FIGS. 10A to 10C are referenced correspondingly, and the description about them will be omitted. The reference numeral 41 represents a minute projection. The whole structure will be described with reference to FIG. 10A. Although this embodiment is different from the first embodiment shown in FIGS. 6A to 6C in that the minute projections 41 are provided along the grooves 13 on the outer circumferential surface of the spacer 11 and on at least a part of portions between the grooves, and that the linear member 15 is fixed to the minute projections 41, the other points are similar to the structure of the sixth embodiment. Each linear member 15 is fixed to the spacer 11 by fixing the linear member 15 to the minute projections 41 in the portion where the linear member 15 contacts with the outer circumferential surface of the spacer 11. The size of this minute projections 41 is defined desirably in accordance with the thickness of the linear member and so on.

The state where the linear member 15 is not fixed yet will be described with reference to FIG. 10B. An array of minute projections 41 are formed along the grooves 13 in at least a part of portions between the grooves on the outer circumferential surface of the spacer 11, preferably in their central portions. A plurality of arrays of these minute projections 41 may be provided on one portion between each two adjacent grooves. The linear member 15 is wound at intervals around such a spacer 11.

The state where the linear member 15 is fixed will be described with reference to FIG. 10C. Since the spacer 11 on which the linear member 15 are wound is pressed from its surroundings, the linear member 15 crushes the minute projections 41 on the spacer 11 so that the linear member 15 is buried in the minute projections 41 so as to be fixed onto the outer circumferential surface of the spacer 11.

Figure 11:
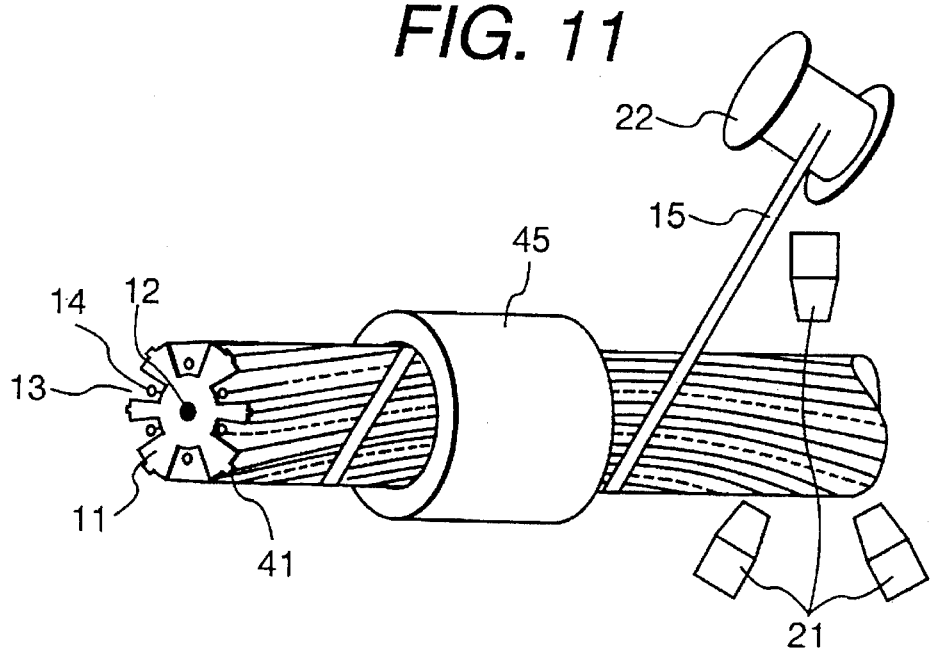
FIG. 11 is an explanatory diagram of a first example of the method of manufacturing the optical cable according to the eighth embodiment of the present invention.

FIG. 11 is an explanatory diagram for explaining a first method of manufacturing the optical cable according to the third embodiment of the present invention. In the drawing, parts similar to those in FIGS. 6A to 7 and 10A and 10C are referenced correspondingly, and the description about them will be omitted. The reference numeral 45 represents a die. When the spacer 11 is formed through extrusion molding, the minute projections 41 are extruded integrally with the body of the spacer 11 in the form that the minute projections 41 project from the outer circumferential surface of the spacer 11. In the process to receive the optical fibers 14 into the grooves 13 of the spacer 11, after the optical fibers 14 are received in the grooves 13, hot air is blown by the hot air generator 21 to thereby heat at least the surface of the spacer 11, particularly, the minute projections 41, and then the linear member 15 fed from the linear member feeding apparatus 22 is wound around the spacer 11 spirally at intervals. Thereafter that, the spacer 11 on which the linear member 15 is wound is passed through the die 45 so as to crush the minute projections, so that the linear member 15 is buried into the minute projections 41 and fixed onto the outer circumferential surface of the spacer 11. Alternatively, the hot air may be blown before the optical fibers 14 are stored in the grooves 13, or heating means may be used in the die 45.

Figure 12:
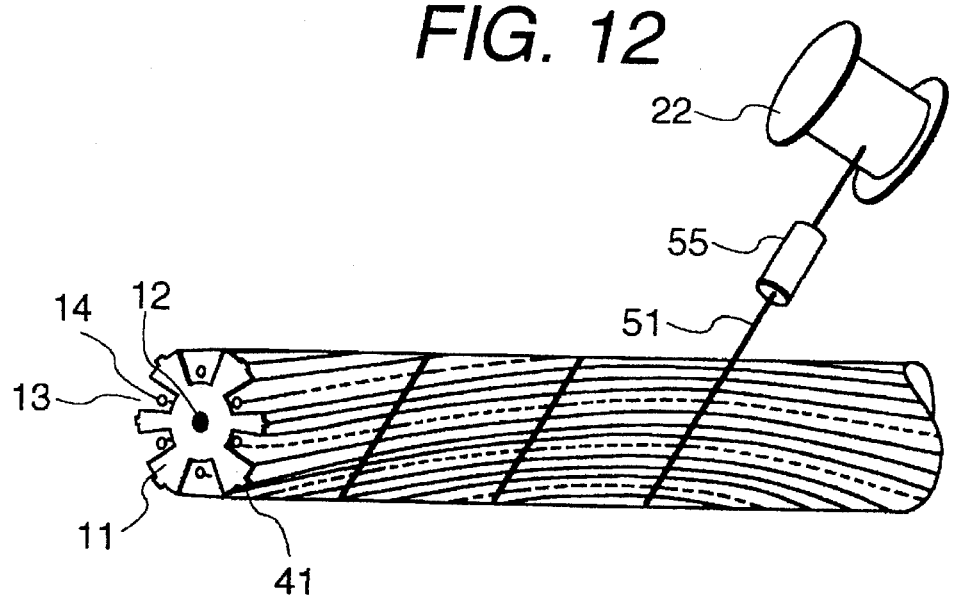
FIG. 12 is an explanatory diagram of a second example of the method of manufacturing the optical cable according to the eighth embodiment of the present invention.

FIG. 12 is an explanatory diagram for explaining a second method of manufacturing the optical cable according to the eighth embodiment of the present invention. In the drawing, parts similar to those in FIGS. 6A to 7 and 10A to 10C are referenced correspondingly, and the description about them will be omitted. The reference numeral 51 represents a steel wire, and 55, a heat unit. This is a manufacturing method using the steel wire 51 as the linear member, and the method of forming the minute projections 41 is similar to that in the first method shown in FIG. 11. In the process to receive the optical fibers 14 into the grooves 13 of the spacer 11, after the optical fibers 14 are received in the grooves 13 and the steel wire 51 fed from the linear member feeding apparatus 22 is heated by the heating means 55 in advance, the steel wire 51 is wound around the spacer 11 spirally at intervals. As a result, the steel wire 51 is buried into the minute projections 41 on the outer circumferential surface of the spacer 11 so as to be fixed onto the outer circumferential surface of the spacer 11.

The same shape and size of the spacer 11, the same material of the linear member 15, the same optical fibers 14 and the like as those used in the sixth embodiment may be used also in the eighth embodiment. In a specific example, minute projections 0.5 mm in width and 1 mm in height were provided continuously in the longitudinal direction along grooves in the respective central portions between the grooves on the outer circumferential surface of a spacer having an outer diameter of 10 mm. Nylon yarn was used as the linear member 15, and wound at a pitch of 20 mm. An approximately cylindrical die having an inner diameter of 10.3 mm was used as the die 45. Consequently, the effect similar to that of the optical cable in the sixth embodiment could be obtained.

In another specific example, minute projections 0.5 mm in width and 1 mm in height were provided continuously in the longitudinal direction on the outer circumferential surface of a spacer having an outer diameter of 10 mm. Steel wire having an outer diameter of 0.1 mm was used as the linear member 15, and wound at a pitch of 20 mm. Consequently, the effect similar to that of the optical cable in the sixth embodiment could be obtained. In this example, it is not necessary to use a bonding agent, so that there is an advantage that the cost of the material of the spacer can be reduced. The method of taking-out an optical fiber is the same as that in the sixth embodiment.

Figure 13:
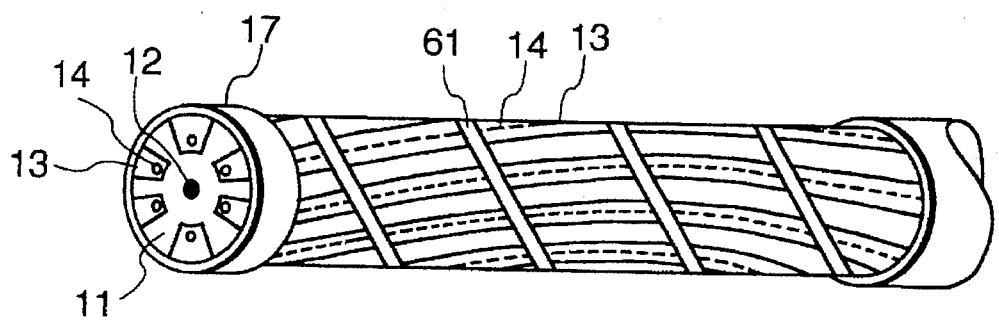
FIG. 13 is an explanatory diagram for explaining a ninth embodiment of the present invention, showing an optical cable where a part of a sheath is removed.

FIG. 13 is an explanatory diagram for explaining a ninth embodiment of the present invention, showing an optical cable in the state where a part of a sheath is removed. In the drawing, parts similar to those in FIG. 6 are referenced correspondingly, and the description about them will be omitted. The reference numeral 61 represents a tape. In this embodiment, although this embodiment is different from the sixth embodiment shown in that the tape 61 to which a bonding agent is applied is used as a linear member instead of a bonding agent applied to the spacer 11, the other points are similar to the structure of the sixth embodiment. A bonding agent is applied to one surface of the tape 61 so that the one surface of the tape 61 is bonded to the spacer 11 at portions where the one surface of the tape 61 contacts with the outer circumference of the spacer 11. The tape 61 is thus fixed to the spacer 11. The method of taking-out an optical fiber is similar to that in the sixth embodiment.

Figure 14:
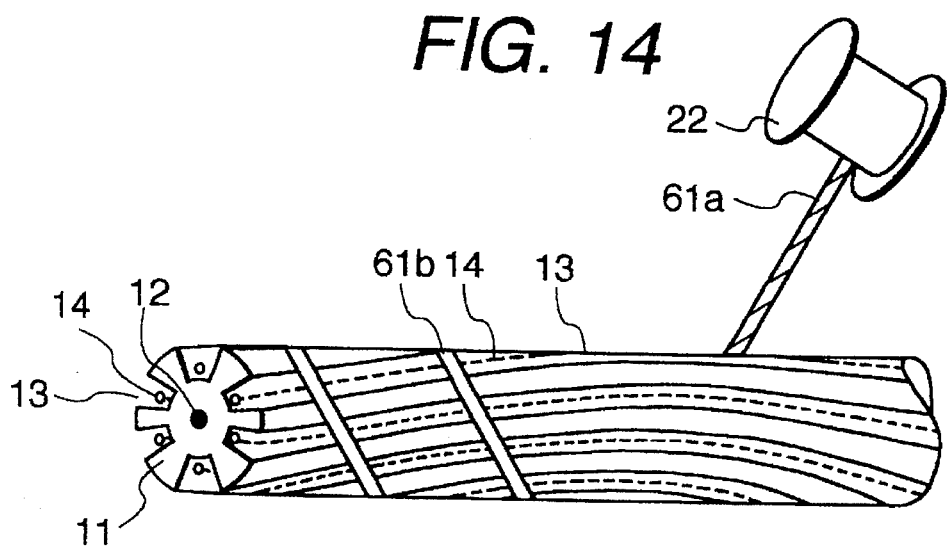
FIG. 14 is an explanatory diagram of an example of the method of manufacturing the optical cable according to the ninth embodiment of the present invention.

FIG. 14 is an explanatory diagram for explaining an example of the method of manufacturing the optical cable according to the fourth embodiment of the present invention. In the drawing, parts similar to those in FIGS. 6A to 6C and 13 are referenced correspondingly, and the description about them will be omitted. The reference numeral 61a represents a bonding surface of the tape, and 61b a not-bonding surface of the tape. In the process to store the optical fibers 14 into the grooves 13 of the spacer 11, the tape 61 fed from the linear member feeding apparatus 22 is wound around the spacer 11 spirally at intervals so that the bonding surface 61a to which a bonding agent is applied is made inside to face the spacer 11 while the not-bonding surface 61b is made outside. As a result, the tape 61 is bonded to the spacer 11 by the bonding agent.

The spacer 11 and the like in the ninth embodiment are similar to those in the sixth embodiment. In a specific example, a tape of polyethylene terephthalate (PET) 2 mm in width and 0.04 in thickness was used as the tape 61, and wound on a spacer having an outer diameter of 10 mm at a pitch of 20 mm. Consequently, the effect similar to that in the sixth embodiment could be obtained. In this embodiment, it is not necessary to provide a special spacer, and it is possible to use a usual spacer, so that the manufacturing cost can be reduced. If a bonding agent which needs no heating or can bond at a low heating temperature is used as the bonding agent, a soft material having a low tolerance to heat can be used for the tape 61. Even if a bonding agent having adhesion at a normal temperature is used, there is no fear that the sheath 17 is bonded to the spacer 11. When heating is not performed in the manufacturing process, it is not necessary to provide a hot air generator or a heating means, and it is possible to reduce the equipment, so that the manufacturing cost can be reduced.

Figure 15:
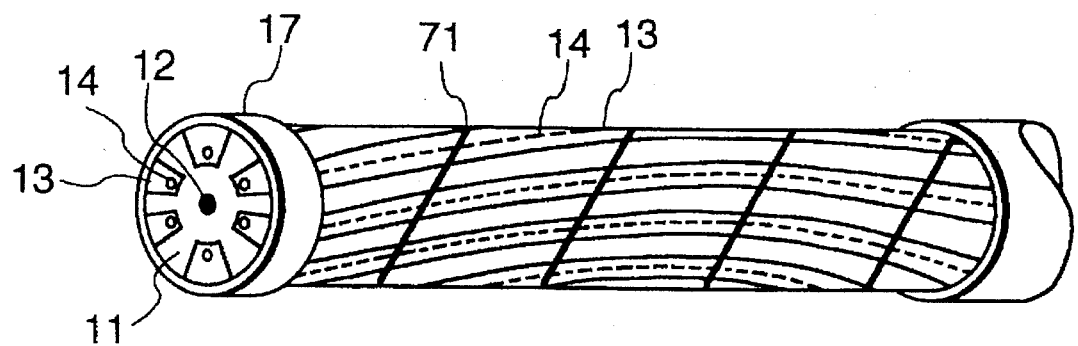
FIG. 15 is an explanatory diagram for explaining a tenth embodiment of the present invention, showing an optical cable where a part of a sheath is removed.

FIG. 15 is an explanatory diagram for explaining a tenth embodiment of the present invention, showing an optical cable in the state where a part of a sheath is removed. In the drawing, parts similar to those in FIG. 6A to 6C are referenced correspondingly, and the description about them will be omitted. The reference numeral 71 represents a linear member having a bonding agent applied in its outer circumference. Although this embodiment is different from the sixth embodiment in that the linear member 71 having a bonding agent in its outer circumference is used as a linear member instead of a bonding agent applied onto the spacer 11, the other points are similar to the structure of the sixth embodiment. The linear member 71 having a bonding agent applied to its outer circumference is bonded to the spacer 11 in the portion where the linear member 71 having a bonding agent applied to its outer circumference contacts with the outer circumference of the spacer 11. Thus, the linear member 71 is fixed to the spacer 11. The method of taking-out an optical fiber is similar to that in the sixth embodiment.

Figure 16:
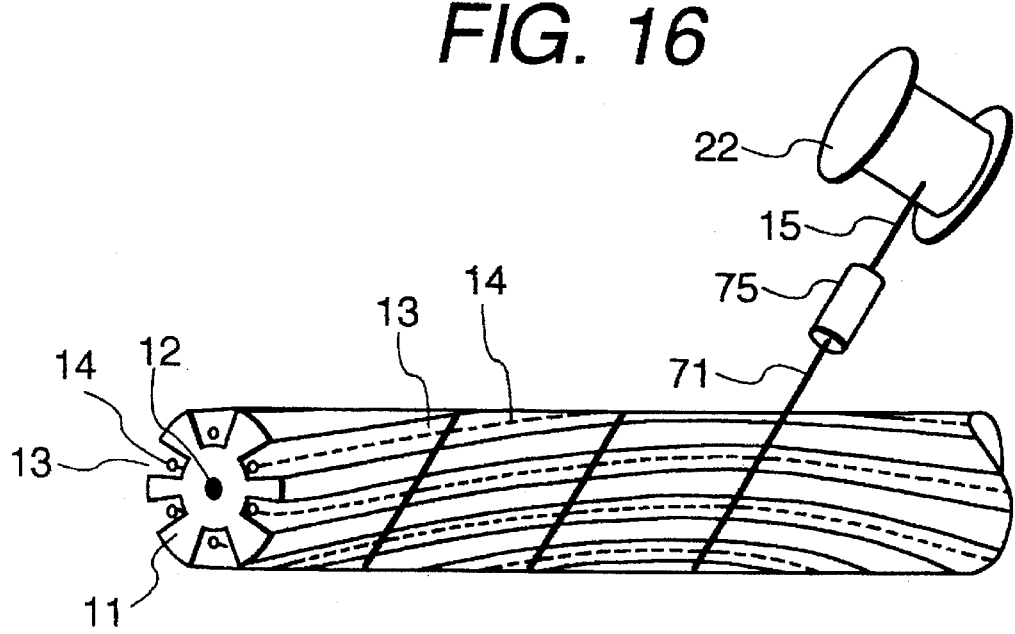
FIG. 16 is an explanatory diagram of an example of the method of manufacturing the optical cable according to the tenth embodiment of the present invention.

FIG. 16 is an explanatory diagram for explaining the method of manufacturing the optical cable according to the tenth embodiment of the present invention. In the drawing, parts similar to those in FIGS. 6A and 7 are referenced correspondingly, and the description about them will be omitted. The reference numeral 75 represents a bonding agent coating die. In the process to receive the optical fibers 14 into the grooves 13 of the spacer 11, the linear member 15 fed from the linear member feeding apparatus 22 is passed through the bonding agent coating die 75 filled with a bonding agent, and is wound around the spacer 11 spirally at intervals as the linear member 71 having a bonding agent in its outer circumference. As a result, the linear member 15 is bonded to the spacer 11 by the bonding agent.

The structure and size of the spacer 11 in the tenth embodiment are similar to those in the sixth embodiment. In a specific example, nylon yarn with its outer circumference coated with polyethylene having a low melting point and being melted by heat was used as the linear member 71 having a bonding agent in its outer circumference. The linear member 15 was wound on a spacer having an outer diameter of 10 mm at a pitch of 20 mm. Consequently, the effect similar to that in the first embodiment could be obtained. In this embodiment, it is possible to use a usual spacer, so that there is an advantage that the manufacturing cost can be reduced.

In the above embodiments, a sheath is given to the outer circumference of a spacer in which optical fibers are received and a linear member is wound around it spirally. A coating of synthetic resin is usually used as the sheath. Of course, the sheath may be constituted by a plurality of layers, for example, by forming layers of synthetic resin over a pressing winding layer. Further, no tensile body may be arranged inside the grooved spacer.

Not to say, in the present invention, it is not necessary to provide the sheath directly on the optical cable. If weatherproof optical fibers are used, the cable may be laid as it is. A plurality of optical cables as described in the above embodiments but provided with no sheath, or provided with simple sheaths such as pressing windings, may be twisted into a multi-core optical cable. In this case, a tensile strength bodies may be disposed at an appropriate place such as at the center portion, or the like.

When a layer of pressing winding is formed of a material similar to that of a linear member in the present invention, the thickness, color, pattern, winding direction, etc. between both the linear member may be changed in order to identify the linear member of the present invention and the linear member of the pressing winding layer.

Although a linear member is wound spirally on a spacer in which optical fibers are received in the above embodiments, at least one linear member may be wound annularly in the vicinity of each of inverted portions of grooves 13. In such a manner, it is possible to reduce the quantity of linear member to be used. In the case where a linear member has a bonding agent as described in the ninth embodiment or in the tenth embodiment, it is possible to reduce the quantity of the bonding agent.

What is claimed is:

1. An optical cable comprising:
   a spacer having a plurality of grooves formed on an outer circumference thereof, the cut direction of said grooves being inverted at a predetermined period;
   optical fibers received respectively in said grooves; and
   a pop-out preventing member which locally seal opening portions of said grooves.

2. An optical cable according to claim 1, wherein said pop-out preventing member is a linear member provided in a longitudinal direction of said optical cable and around said grooved spacer, said pop-out preventing member being integrated with said grooved spacer in a portion where said pop-out preventing member contacts with an outer circumference of said grooved spacer.

3. An optical cable according to claim 2, wherein said linear member is at least one of a tape, a ribbon, a yarn, a string, a non-twisting yarn and a metal wire, and said linear member is integrated with said spacer in a portion where said pop-out preventing member contacts with the outer circumference of said spacer.

4. An optical cable according to claim 3, wherein said linear member is at least one of a yarn made of synthetic resin and a metal fiber.

5. An optical cable according to claim 1, wherein said pop-out preventing member is an annular member which is provided in the vicinity of inverted portions of said grooves, and is integrated with said spacer in portions where said pop-out preventing member contacts with the outer circumference of said spacer.

6. An optical cable according to claim 5, wherein said annular member has a cutaway portion.

7. An optical cable according to claim 1, wherein said pop-out preventing member is a net member comprising linear members which are netted around said spacer and combined with each other in the intersecting portions of the net.

8. An optical cable according to claim 1, wherein said pop-out preventing member is a nail member which is provided in the vicinity of an inverted portion to project a side edge of said groove to cover said opening portion to make the width of said opening portion smaller than the diameter of each of said optical fiber.

9. An optical cable according to claim 1, wherein said pop-out preventing member is a nail member which is provided in the vicinity of an inverted portion to project from an inner side edge of said groove toward an outer side edge of said groove to cover said opening portion.

10. An optical cable according to claim 1, wherein said optical fibers received in said grooves have coatings which can be identified.

11. An optical cable according to claim 1, wherein said optical cable further comprises a sheath on its outer circumference.

12. An optical cable according to claim 1, further comprising a bonding agent being provided along said grooves on at least a part of portions on an outer circumferential surface of said spacer between said grooves, wherein said pop-out preventing member is a linear member which is wound at intervals on the outer circumferential surface of said spacer and bonded thereto.

13. An optical cable according to claim 1, further comprising a bonding agent layer being provided on an outer circumferential surface of said spacer, wherein said pop-out preventing member is a linear member which is wound at intervals on the outer circumferential surface of said spacer and bonded thereto.

14. An optical cable according to claim 1, further comprising projections being provided along said grooves on at least a part of portions on an outer circumferential surface of said spacer between said grooves, wherein said pop-out preventing member is a linear member being wound at intervals on an outer circumferential surface of said spacer and bonded with said projections.

15. An optical cable according to claim 1, wherein said pop-out preventing member is a linear member having a bonding agent on at least a winding surface thereof being wound at intervals on an outer circumferential surface of said spacer and bonded thereto.

16. An optical cable according to claim 15, wherein said linear member has said bonding agent on whole of the outer circumferential thereof.

17. An optical cable according to claim 12, said linear member is wound spirally on the outer circumferential surface of said spacer.

18. An optical cable according to claim 13, said linear member is wound spirally on the outer circumferential surface of said spacer.

19. An optical cable according to claim 14, said linear member is wound spirally on the outer circumferential surface of said spacer.

20. An optical cable according to claim 15, said linear member is wound spirally on the outer circumferential surface of said spacer.

21. An optical cable according to claim 1, wherein said spacer has a tensile strength body in its inside.

* * * * *